Jan. 27, 1959   J. T. VOLLBRECHT ET AL   2,870,635
COMPENSATED WATER LEVEL INDICATOR

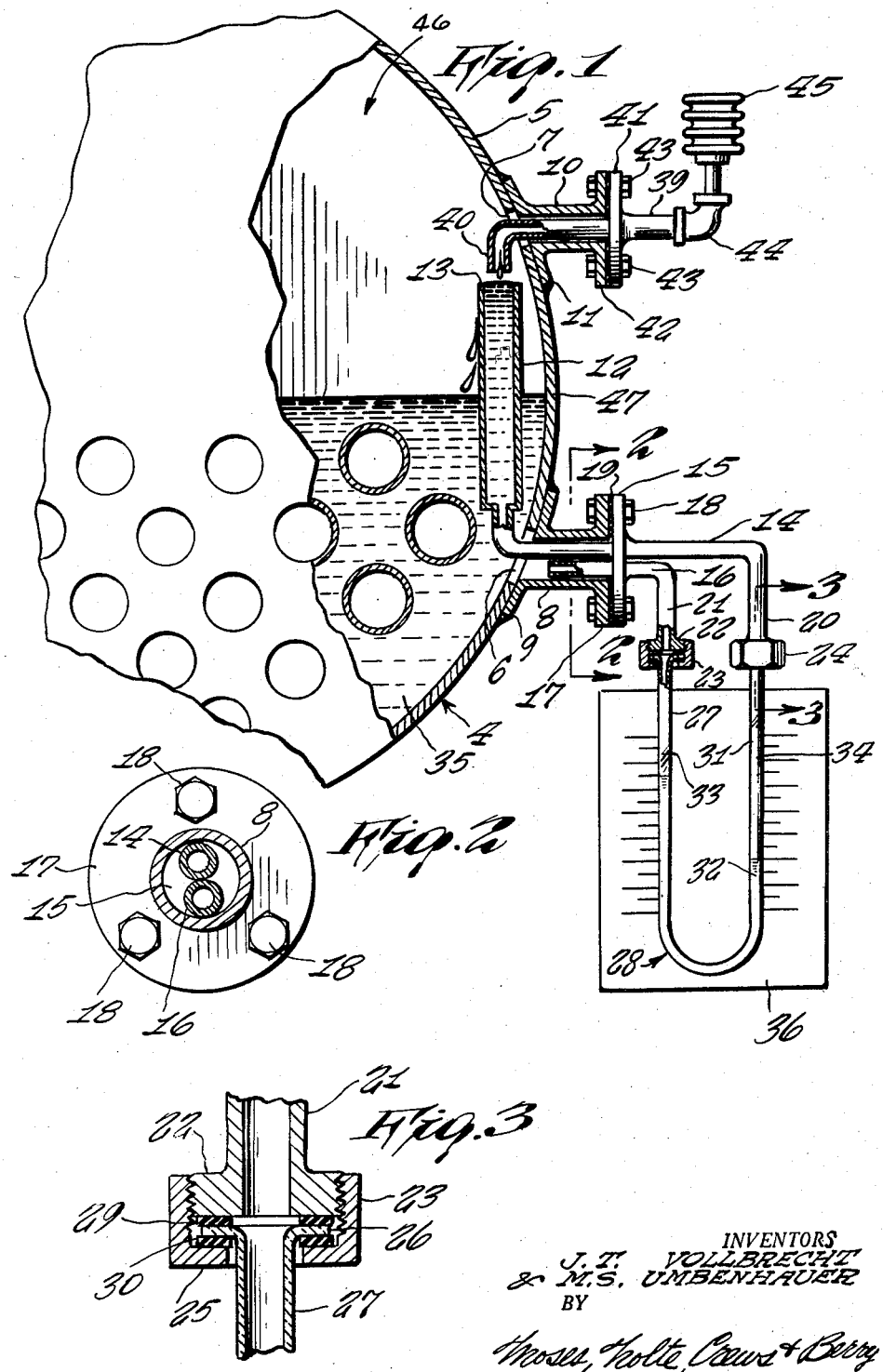

Filed Oct. 20, 1955   2 Sheets-Sheet 2

INVENTORS
J. T. VOLLBRECHT.
M. S. UMBENHAUER.
BY
Moses, Nolte, Crews + Berry
ATTORNEYS.

United States Patent Office 2,870,635
Patented Jan. 27, 1959

2,870,635

COMPENSATED WATER LEVEL INDICATOR

Justus T. Vollbrecht, Princeton, and Milton S. Umbenhauer, Chatham, N. J.

Application October 20, 1955, Serial No. 541,763

10 Claims. (Cl. 73—299)

This invention relates to indicators and the like for steam boilers, and particularly to a special compensated water level indicator.

The main object of our invention is to provide a boiler or steam generator, or even a water heater with a water level indicator that is so designed and arranged with respect to the boiler involved that it will accurately and faithfully indicate the level of the water within the boiler constantly at all times.

An ancillary object of the invention is to have a water level indicator so located as to eliminate any inaccuracies of indication from loss of temperature which are all too frequently inherent in conventional water level indicators.

Another object of this invention is to have a special indicator tube mounted within the boiler in protected position and connected to an external manometer provided with scale indications for reading the water level within the boiler or other container.

A further object of the invention is to include a water tube within the boiler or container which is open at a reference level point while being connected at the bottom to the external manometer, while the other end of the latter is connected to the interior of the boiler below the water level.

It is even an object of our invention to have a form of water level indicator with which the manometer will indicate the correct deviation in level regardless of the saturation pressure in the boiler or container.

It is likewise an object of our invention to include means for automatically maintaining the upper end of the water indicator tube full to a predetermined level within the boiler and thereby insuring the correctness of every level reading at the manometer.

An object of the invention is naturally to provide a boiler or high pressure fluid container with a fluid level indicator of the character referred to which is simple to make and install and certain to operate and be free from parts likely to go out of order.

Other objects and advantages of our invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a fragmentary elevation of a boiler partly in section with a compensated water level indicator installed which embodies the invention in a practical form;

Figure 2 is an enlarged transverse section taken on line 2—2 in Figure 1;

Figure 3 is a vertical section on an enlarged scale of part of the same device as taken on line 3—3 in Figure 1.

In these views, the same reference numerals indicate the same or like parts throughout.

Figure 4:
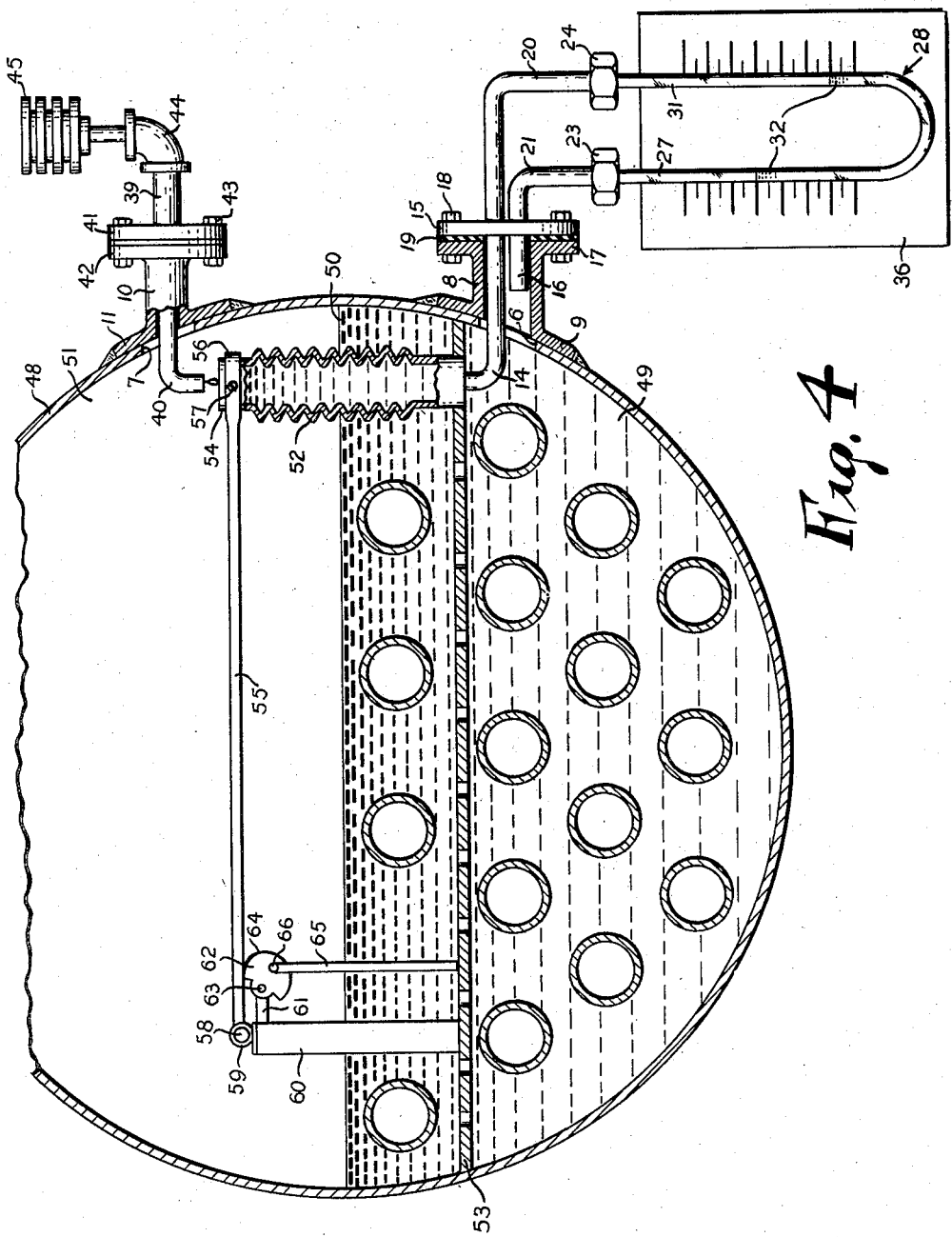
Figure 4 is a similar view to that of Figure 1, but illustrates a modification.

It is usual to find boilers, water heaters and high pressure fluid containers provided with conventional liquid level indicators having an exposed gauge tube or the like mounted upon the exterior of the boiler or container involved. The temperature of the indicating fluid in this exposed tube is not and cannot be the same as that of the interior of the boiler, and hence, a noticeable loss of accuracy in the indicator reading results. This becomes considerable when high temperatures and pressures are involved, for the loss then becomes more apparent. For example, in a modern boiler, the pressure may be in the range of 2,700 pounds per square inch, so that the temperature of the water is of the order of 600° F.

If the reference tube is then mounted upon the exterior of the boiler, the temperature of the water in this tube would likely be about 300° to 400° F. at best, even when special precautions are taken to raise the temperature by using steam from the boiler. A difference in temperature of the order mentioned would unavoidably result in a substantial error in the reading obtained on the manometer or other indicating device used.

In order to eliminate such false readings and instead provide for true and accurate indicator readings at all times, we propose to mount the reference tube within the boiler or heater or the like in such manner and position as will now be described in detail in the following.

Hence, in the practice of our invention, a boiler or the like 4 has the wall 5 thereof provided with two openings 6 and 7 spaced a distance apart in such fashion that one opening 7 is substantially above the other. To the lower opening is fitted a relatively large fixture or nozzle 8, by brazing, welding or otherwise securing the inner flange 9 thereof directly to the boiler wall 5. In similar fashion, a second fixture or nozzle 10 is secured by brazing, welding or otherwise securing the inner flange 11 thereof to the wall 5 at the upper opening. The lower opening 6 is large for a two-fold reason, the first being to allow introduction of a wide reference tube 12 with an open top 13 and having the lower end connected to the inner end of a pipe 14 extending inwardly through fixture 8 and at its inner end bending upwards to join with tube 12. Upon this pipe is fixed a large flange 15 through which a relatively shorter pipe 16 extends at least part way through or into fixture 8, being directed toward, if not through wall opening 6.

Upon the outer end of this fixture 8 is an outer integral flange 17, also shown in Figure 2, to which flange 15 integral with manometer pipes 14 and 16 is secured by bolts 18, 18 etc., in order to provide a steam tight connection for both pipes with the interior of the boiler, a gasket 19 serving to make the connection between the flanges finally tight. Beyond the flange 15, manometer pipe 14 continues horizontally a given distance and then bends down to form depending pipe 20, while in the same fashion, pipe 16 continues beyond this flange horizontally but a short distance and then bends down to form depending pipe 21. As best seen in Figure 3, at the lower end of each of depending pipes 20 and 21 is an externally threaded flange 22 upon which is screwed a connecting collar 23 or 24, as the case may be, having a lower flange 25 for clamping the upper flared flange 26 of one leg 27 of a manometer indicated at 28. A pair of washers 29 and 30 are disposed between the flange 26 and the pipe flange 22 and collar flange 25 for tightness. The other leg 31 of the manometer is similarly secured to depending pipe 20 by collar 24, while the manometer 28 has a predetermined small amount of reference fluid 32 within it, and above this fluid, the water 33, 34 in these legs 27 and 31 is that of the interior body 35 of water within the boiler. The manometer is mounted on a scale plate 36 having two sets 37 and 38 of scale markings thereon, one for each leg so that the level in each leg of the reference fluid may be noted and compared with that of the other leg and thereby read the figure or level of the water inside the boiler.

The reading of the level by means of the manometer is maintained accurate by making certain that the level of the water in reference tube 12 remains the same at all times. This is accomplished by securing a condenser tube 39 in position to drip water from its inner depending end 40 by attaching a flange 41 fixed thereon to the outer flange 42 on fixture 10 by bolts 43. At its outer end, pipe 39 is connected by an elbow 44 to a bellows type condenser 45 directly above it, being thus disposed in effective position to condense steam from the upper steam chamber 46 of the boiler 4, which condensed steam then runs down through pipe 39 and drips from its depending end 40 into reference tube 12. As the tube 12 is upwardly open, any excess water from the condenser simply drains off this tube and merely insures the latter of being always full to the top 13 which is a reference level for the water in this tube. Inasmuch as tube 12 is full at all times, the high temperature of the boiler interior is also maintained in the reference tube. The water column from the actual water level 47 to the open top 13 of the reference tube 12 will be registered in the manometer 28.

Thus, when the water level 47 in the boiler is low, the level of reference fluid 32 in leg 31 will be relatively low by comparison with the fluid level in the left leg 27. However, when water has been introduced from the outside into the boiler to raise the water level 47 therein, the level of the reference fluid in the mentioned right leg 31 will rise in corresponding manner to indicate the raised level within the boiler, while the level in left leg 27 will be correspondingly lower. It is this difference between the two levels of the reference fluid 32 in the legs 31 and 27 that serves to indicate the water level in the boiler. When the levels in the manometer 28 are equal, the boiler water level 47 will be at the open top 13 of the reference tube 12.

In Figure 4 is shown a modification wherein differences in density of the water column in reference tube 12 will be automatically compensated as the saturation temperature and pressure change in the boiler. As the saturation pressure increases therein, the accompanying temperature rise is used in a special manner to increase the effective height or length of the reference tube accordingly.

In this figure, boiler or container 48 contains a quantity of water 49 up to the level 50 to be indicated, and above this the steam chamber 51, similar to the corresponding features of Figure 1. In addition, the fixtures 8 and 10, condenser 45, pipes 20 and 21, inverted U-shaped tube or manometer 28, inner upper extension 40 of pipe 39, as well as lower inner extension 14 of pipe 21 all serve in the same manner as the same numbered parts in the form of the invention shown in Figure 1.

Instead of reference tube 12 being connected to inner extension 14 of pipe 20, an expansible reference tube 52 is fixed at its lower end upon the upwardly directed end of tube 14. At about the same level is fixed a supporting partition 53 in horizontal position within the boiler for supporting expansion tube 52 and also other elements about to be described. The upper open end 54 of tube 52 is, of course, disposed directly beneath the depending end of tube 40 in effective position to receive condensate from condenser 45 by way of pipe 39 and tube 40 in constant supply. This upper end 54 is capable of being raised and lowered by means of a lever 55 secured at its one end 56 by screw or pin 57 to end 54 of flexible tube 52 in response to changes in temperature and pressure within steam chamber 51 of the boiler 48.

The other end of lever 55 is pivotally mounted by a pin or screw 58 upon the upper end 59 of a stationary post 60 fixed on partition support 53, this post being made of a material substantially unaltered by temperature changes through a considerable range, one type is a metal alloy known as INVAR. Upon this fixed and temperature neutral post or support is fixed a rigid arm 61 forming a fulcrum or pivot for a cam 62 pivoted thereon by a pin or the like 63 and having a profile 64 calculated or plotted by test to operate to raise the lever 55 which rests thereon in a manner to respond to changes in temperature within chamber 51. To effect this result, a heat responsive metal or alloy rod 65 is mounted and supported upon partition support 53 with its upper end connected by a pin or screw 66 to the cam eccentrically of its fulcrum point at 63.

The resulting arrangement is such that when the temperature within the boiler rises, as well as the pressure, the density of the water column within reference tube 52 decreases, but this temperature rise also causes rod 65 to expand and thereby raise the pivot connection 66 upon cam 62 and partly rotates this cam upon its fulcrum mounting 63, inasmuch as the supporting post 60 remains substantially the same as before. The profile 66 is of such curvature that by such rotation, the cam will raise lever 55 and thereby raise the upper end 54 of flexible tube 52 the correct distance to lengthen the water column within this tube to compensate for the loss in density occurring by the temperature rise.

In other words, as the saturation pressure increases in the boiler, the saturation temperature likewise increases, this rise in temperature acts on expansion rod 65, and increases its length so that it acts through cam 62 on lever 55 to raise the upper end of reference tube 52. It is to be noted that both pivot points 58 and 63 are unaltered as they both are supported by rigid post 60, while the cam profile is shaped in such form as to correct for any lack of linearity of the relationship between the density of the fluid in the boiler or container 48 and the temperature corresponding to the saturation pressure therein.

The net result is that the manometer not only reads the true value of the water level when the container operates at a fixed temperature or saturation pressure, but will also be compensated for differences in density of the reference fluid when conditions change so that the boiler operates above or below the fixed temperature or pressure. This results because the temperatures of the reference leg are the same as the temperatures of the moving leg.

For example, a boiler operating at 1,000 p. s. i. will indicate a correct reading of water level by noting the internal reference leg tube 27 when it operates at 1,000 p. s. i. because the reference leg and moving leg are of equal density and the amount of deflection of the manometer fluid can be interpreted by calculation into deviation of water level in the boiler in inches or other linear measurement. When the boiler is operating at some other pressure than at 1,000 p. s. i., for example at 500 p. s. i., then the density of the fluid in the boiler and the reference tube is greater than at 1,000 p. s. i., due to lower saturation temperature at lower pressure. The difference in density between the reference leg and the moving leg is therefore not the same as when the boiler operates at 1,000 p. s. i.

This difference at 500 p. s. i. creates a different amount of deflection of the manometer fluid than the difference under 1,000 p. s. i. conditions. This difference, however, can be interpreted by calculation into deviation of water level in the boiler in inches or other linear measurement.

The mentioned difference in deflection of the manometer fluid for variations of saturation pressure and temperature in the boiler or container are sometimes compensated for by external means, as for instance by the use of a Bourdon tube element to change the linkage in a recording manometer mechanism and the like. The apparatus of Figure 4 includes means for compensating the internal reference leg for differences in density as the temperature of the boiler changes corresponding to changes in saturation pressure, such means being in contrast with such prior makeshifts.

Hence, the manometer when coupled to the present compensating device will indicate the correct deviation in fluid level regardless of the saturation pressure within the boiler or container.

It is evident from the foregoing that no portion of the water level indicator is exposed in such manner as to lose heat which can effect the reading of the true water level, for the reference tubes 12 and 52 which are important are wholly included within the boiler involved.

The manometer may be replaced by some other form of indicator, if desired, but that shown and described serves the present purpose, and the automatic filling of the reference tube according to our invention forms a constant compensation that makes the result certain and accurate in every case.

We have described what we believe to be the best embodiments of our invention. We do not wish, however, to be confined to the embodiments shown, but what we desire to cover by Letters Patent is set forth in the appended claims.

We claim:

1. A compensative water level indicator for a boiler having spaced openings in the bounding wall thereof, including a pair of pipes extending through one of said openings in steam tight manner, a water level indicating device connected to the outer ends of said pipes externally of said opening, one of said pipes communicating with the interior of said boiler below the normal minimum water level therein, an upright reference tube connected to the inner end of the other pipe and having an open upper end forming a reference water column in said reference tube, the liquid level of the water in said tube being substantially above the normal operating liquid level of water in said boiler, a condenser located outside said boiler and connected to the interior thereof through the other one of said openings whereby steam generated in said boiler is continuously condensed in said condenser and condensed vapor is returned as liquid to said boiler, said condenser having a connection terminating directly above said reference tube and arranged to direct condensate into said tube to maintain the liquid level of the reference water column constant.

2. A compensated water level indicator according to claim 1, wherein the indicating device includes a manometer connected to the outer ends of the two pipes and having a reference fluid within the same, and wherein a scale plate and the like is mounted adjacent to the manometer for noting the levels of the fluid in the legs of said manometer with respect to each other.

3. A compensated water level indicator according to claim 1, wherein the reference tube is of variable length and the boiler contains means responsive to variations in temperature and capable of altering the length of the reference tube in response to the temperature variations to correspond to variations in density of fluid in said reference tube resulting from said temperature variations or changes and means connecting said reference tube to said responsive means.

4. A compensated water level indicator according to claim 1, wherein the reference tube is of flexible construction and variable in length, and a movable member responsive to temperature changes located within the boiler or container connected to the open end of the reference tube adapted to alter the length of said tube in response to such temperature changes to correspond to variations in density of fluid in said reference tube.

5. A compensated water level indicator according to claim 1, wherein the reference tube is of flexible construction and variable in length or height, and a stationary support is disposed within the boiler or container with a lever pivotally mounted at one end thereon and at the other end connected to the open end of said reference tube, and wherein a member responsive to temperature changes within said boiler is mounted in effective position to cause the lever to be rocked upon its pivot mounting whereby to correspondingly alter the length or height of said reference tube by means of said lever.

6. A compensated water level indicator according to claim 5, wherein the support includes a fixed member having a pivot mounting for the lever upon the upper portion thereof and consisting of a material of low coefficient of expansion, and wherein the member responsive to temperature changes includes an elongated bar of material having a high coefficient of expansion, and means is included for transferring the changes in the length of said member responsive to temperature changes to the lever in order to move the same and thereby alter the position of the open end of the reference tube.

7. A compensated water level indicator according to claim 6, wherein the means for transferring changes in the length of the elongated bar to the lever includes a cam eccentrically pivoted upon the fixed member or support beneath the lever with a cam profile portion variably supporting said lever a predetermined short distance from the pivot mounting thereof upon the stationary member, and wherein the elongated bar is stationary at one end thereof and is pivotally connected at the other end to an eccentric point upon said cam.

8. A compensated water level indicator according to claim 7, wherein the boiler contains a fixed supporting member upon which the fixed member and the lower end of the reference tube are mounted and which supports the elongated bar with the high coefficient of expansion.

9. A compensated water level indicator according to claim 5, wherein the boiler has a fixed supporting member upon which the stationary support is mounted and upon which the reference tube also is mounted, and the member responsive to temperature changes is an elongated bar of metal with a high coefficient of expansion mounted upon the fixed supporting member, and wherein a cam is pivotally mounted upon the stationary support and has a predetermined curved profile portion directly variably supporting the lever at a point remote from the reference tube, and the elongated bar is pivotally connected to the cam eccentrically upon the latter with the end of said elongated bar remote from said fixed supporting member.

10. A compensated water level indicator according to claim 9, wherein the stationary supporting member, upon which the lever is pivotally mounted, is constructed from a material having a low coefficient of expansion whereby the pivot for the lever remains substantially fixedly positioned with respect to said fixed supporting member.

References Cited in the file of this patent

UNITED STATES PATENTS

| 1,699,075 | McNeill | Jan. 15, 1929 |
| 2,334,463 | Winton | Nov. 16, 1943 |
| 2,337,171 | Winton | Dec. 21, 1943 |
| 2,347,860 | Winton | May 2, 1944 |
| 2,500,443 | Winton | Mar. 14, 1950 |
| 2,747,404 | Van Ham | May 29, 1956 |